United States Patent [19]
Yamada et al.

[11] Patent Number: 5,469,307
[45] Date of Patent: Nov. 21, 1995

[54] MAGNETIC TAPE RECORDING/PLAYBACK APPARATUS FOR AUTOMATICALLY DETECTING A DESIRED PROGRAM

[75] Inventors: Tomoyasu Yamada; Nobutoshi Fukuda, both of Saitama, Japan

[73] Assignee: Pioneer Electronic Corporation, Tokyo, Japan

[21] Appl. No.: 115,790

[22] Filed: Sep. 3, 1993

Related U.S. Application Data

[63] Continuation of Ser. No. 908,909, Jul. 2, 1992, abandoned, which is a continuation of Ser. No. 680,777, Apr. 2, 1991, abandoned, which is a continuation of Ser. No. 240,333, Sep. 6, 1988, abandoned.

[30] Foreign Application Priority Data

| Sep. 30, 1987 | [JP] | Japan | 62-244407 |
| Sep. 30, 1987 | [JP] | Japan | 62-244408 |
| Sep. 30, 1987 | [JP] | Japan | 62-244409 |
| Sep. 30, 1987 | [JP] | Japan | 62-244410 |
| Oct. 1, 1987  | [JP] | Japan | 62-245760 |
| Oct. 2, 1987  | [JP] | Japan | 62-248069 |
| Oct. 14, 1987 | [JP] | Japan | 62-257435 |

[51] Int. Cl.$^6$ ............................... G11B 15/18
[52] U.S. Cl. ............................... 360/69; 360/71
[58] Field of Search ............................ 360/91, 92, 72.1, 360/69, 71; 369/75.1, 178, 179

[56] References Cited

U.S. PATENT DOCUMENTS

| 3,938,190 | 2/1976  | Semmlow et al. | 360/92 X |
| 4,622,610 | 11/1986 | Makigawa       | 360/92   |
| 4,779,151 | 10/1988 | Lind et al.    | 360/92   |

FOREIGN PATENT DOCUMENTS

| 0224465 | 6/1987 | European Pat. Off. . |
| 0257534 | 3/1988 | European Pat. Off. . |
| 2366661 | 4/1978 | France . |
| 2517863 | 6/1983 | France . |
| 2570538 | 3/1986 | France . |

OTHER PUBLICATIONS

Kazama et al., Automatic Storage And Retrieval Of Videotaped Programs, SMPTE Journal vol. 88 Apr. 1979 pp. 221–223.
Fernseh Und Kino Technik, vol. 36, No. 5, May 1982, pp. 171–177, "Dezentrales Mikroprozessorsystem am Beispiel eines Multikassettenautomaten," Hedtke et al.
Patent Abstracts Of Japan, vol. 9, No. 83, (P–348)(1806), Apr. 12, 1985, Abstract of JPA–59–213062.
Patent Abstracts Of Japan, vol. 6, No. 79 (P–115)(957), May 18, 1982, Abstract of JPA–57–015255.
Patent Abstracts Of Japan, vol. 6, No. 137 (P–130)(1016), Jun. 24, 1982, Abstract of JPA–57–060563.
Patent Abstracts Of Japan, vol. 9, No. 68 (P–344)(1791) Mar. 28, 1985, Abstract of JPA–59–201262.
Journal Of The Society Of Motion Picture Engineers. vol. 88, No. 4, Apr. 1979, pp. 221–223. "Automatic Storage and Retrieval of Videotaped Programs", Kazama et al.

*Primary Examiner*—Andrew L. Sniezek
*Attorney, Agent, or Firm*—Sughrue, Mion, Zinn, Macpeak & Seas

[57] ABSTRACT

A magnetic tape cassette recording and playback apparatus, particularly for digital audio tapes, capable of performing a variety of controlled playback and recording operations in accordance with a user-inputted program. The cassettes are stored on shelves in a magazine and selectively extracted and transported to a drive unit for playing and recording. In one mode, the apparatus can carry out continuous recording from one cassette to another, and cassettes can be designated for recording, for instance, of only particular types of music. The cassettes are rewound at the completion of a playing program so as to be ready for the start of search operations for a subsequent program.

12 Claims, 12 Drawing Sheets

MAGNETIC TAPE RECORDING/PLAYBACK APPARATUS FOR AUTOMATICALLY DETECTING A DESIRED PROGRAM

This is a Continuation of application No. 07/908,909 filed Jul. 2, 1992, now abandoned, which is a Continuation of application No. 07/680,777 filed Apr. 2, 1991, now abandoned, which is a Continuation of application No. 07/240,333, filed Sep. 6, 1988, now abandoned.

BACKGROUND OF THE INVENTION

The present invention relates to a magnetic recording/playback apparatus, specifically, a digital audio tape recorder for recording data on and reproducing data from a magnetic tape stored in a cassette, particularly for recording audio signals in the form of PCM signals on the magnetic tape and reproducing the audio signals thus recorded from the magnetic tape.

In such a digital audio tape recorder, digital signals are used to record/reproduce audio signals of, e.g., music, making it possible to obtain sound of a quality unavailable from a conventional tape recorder. Moreover, such an audio tape recorder can be made multifunctional in that varieties of ID codes representing the heads of programs, program numbers, time data and the like can be recorded so that a desired program can readily be retrieved and played back in a short time.

However, the user has to replace one cassette with another after completing a recording operation to continually replay a plurality of cassettes because one cassette must be loaded each time for recording/playback purposes. Such an operation becomes invariably troublesome.

Moreover, the tape player of such a conventional type has posed a problem in that, if the user happens to forget which cassette has been loaded therein, it is necessary to interrupt the playback operation to extract the cassette and examine the label thereof or the like in order to ascertain the contents of the cassette. In the case of a car stereo system, for instance, if only the operating unit is arranged in the passenger compartment with the mechanical portion of the apparatus placed in the trunk, it cannot be confirmed which of the cassettes has been loaded without stopping the car. Therefore, the leading end of each cassette must be played to ascertain the contents of the cassettes. For this, the operator must push the operating button each time one cassette is played for the purpose of confirmation. Such operations are extremely troublesome and time-consuming.

Further, when a program is reproduced in the conventional tape recording/playback apparatus, a desired cassette is returned to a magazine after a desired piece of music has been played, and the next cassette is drawn so that desired pieces of music can be reproduced in a repetitive manner. Upon completion of the reproduction of the final piece, the last cassette is returned to the magazine and all operations terminated. In this apparatus, the cassettes are returned to the magazine without being rewound. Accordingly, the cassettes must be rewound before being played again. It therefore not only takes time to restart playback, but also a double playback operation is needed.

Yet further, when, in a conventional apparatus recording is carried out on a timer basis, such as when recording radio broadcast programs, it is not possible, for example, to record popular songs on a first cassette, pop songs on a second cassette, and jazz on a third cassette. Thus, to separate the different types of music onto respective cassettes, manual editing must be performed.

SUMMARY OF THE INVENTION

An object of the present invention is to provide a magnetic recording/playback apparatus such as a digital tape recorder in which a plurality of cassettes are stored in such a manner that they can be replayed continually and in which the operability of the apparatus is improved by automatically detecting a desired program from the plurality of cassettes.

This object is accomplished by providing a magnetic recording/playback apparatus having a timer playback function and a search function, and which is used for reproducing data relative to a cassette installed in a tape drive unit, the recording/playback apparatus comprising: a plurality of storage shelves for storing a plurality of cassettes; cassette transfer means for transferring a cassette from a designated storage shelf to the tape drive unit, and vice versa; cassette detection means for detecting the presence or absence of a cassette on each storage shelf; and control means for detecting the presence or absence of cassettes stored on the storage shelves sequentially in an order set by the cassette detection means, designating a detected storage shelf as being loaded with a cassette and instructing the cassette transfer means to transfer the cassette thus detected to perform a playback operation, conducting a search and playback operation by searching for and playing back programs for a predetermined time from the beginning of playback of each program, and again conducting a search and playback operation relative to the next cassette when no program is detected as the result of search.

Another object of the present invention is to provide a magnetic recording/playback apparatus such as a digital tape recorder in which a plurality of cassettes are stored in such a manner that they can be replayed continually and continuous recording can be carried out by designating a next cassette for use in continuous recording.

The above object can be accomplished by providing a magnetic recording/playback apparatus for recording data on a magnetic tape stored in a cassette installed in a tape drive unit, the magnetic recording/playback apparatus comprising a plurality of storage shelves for storing a plurality of cassettes, cassette transfer means for transferring a cassette from a designated storage shelf to the tape drive unit and vice versa; operating means for designating a storage shelf; memory means for storing the storage shelf designated by the operating means; and control means for storing the storage shelf data designated by the operating means in the memory means during a recording operation, designating the storage shelf data stored in the memory means when a recording operation is terminated, and instructing the cassette transfer means to transfer the cassette stored on the designated storage shelf to thereby carry out a recording operation.

A further object of the present invention is to provide a magnetic recording/playback apparatus such as a digital tape recorder in which a plurality of cassettes are stored and a different cassette can be selected depending on the operating mode in order to improve the operability of the apparatus.

The aforesaid object is accomplished by providing a magnetic recording/playback apparatus for recording data on a magnetic tape stored in a cassette installed in a tape drive unit, the magnetic recording/playback apparatus comprising a plurality of storage shelves for storing a plurality of cassettes; cassette transfer means for transferring a cassette from a designated storage shelf to the tape drive unit and vice versa; mode setting means for selecting and setting operating modes including playback and recording modes; and control means for designating a predetermined first storage shelf when the playback mode is selected and instructing the cassette transfer means to transfer the cassette to the tape drive unit to perform a playback operation thereon and for designating a predetermined second storage shelf when the recording mode is set and instructing the cassette transfer means to transfer the cassette to the tape drive unit to perform a recording operation thereon.

A still further object of the present invention is to provide a magnetic recording/playback apparatus such as a digital tape recorder in which a plurality of cassettes are stored in such a manner that the same process is automatically applicable to the plurality of cassettes through a simple operation so that the operability of the apparatus is improved.

The above object is accomplished by providing a magnetic recording/playback apparatus for recording and/or reproducing data on a cassette installed in a tape drive unit, the recording/playback apparatus comprising: a plurality of storage shelves for storing a plurality of cassettes; cassette transfer means for transferring a cassette from a designated storage shelf to the tape drive unit and vice versa; operating means for designating a particular storage shelf; memory means for storing data indicative of the storage shelf designated by the operating means; and control means for designating the storage shelves stored in the memory means successively and instructing the cassette transfer means to transfer a cassette when the operating mode is designated and for conducting a process in the operating mode thus designated on the cassette stored on the designated storage shelf.

It is yet another object of the invention to provide for a tape recorder in which, if the user forgets which cassettes have been loaded, leading ends of the cassettes can successively be played by pressing only one of the control buttons, thereby to free the user from taking out the cassettes as before to manually check each tape.

This object is accomplished by providing an auto-changer for a tape recorder of the type used to load a cassette in a drive unit in a tape recorder body and to replay the cassette for a fixed interval, wherein the cassette is returned to the changer means after completion of playback, whereas the next cassette is replayed in a repetitive manner, whereby only the head portion of every cassette need be played.

It is yet another object of the invention to provide a tape recording/playback apparatus in which, because at least a cassette with its tape end completely replayed is rewound at the time all cassettes are played, the time required to rewind the cassette with its tape end completely played can be saved at the time the next program is reproduced, whereby the total search time is shortened because the tape can be played from its head end.

This object is accomplished by providing a tape recording/playback apparatus in which cassettes are transported from a magazine to a tape drive unit for playing for fixed interval, wherein when the tape end of the cassette being played according to a program is detected, the number of the cassettes is stored in memory, and wherein at least the cassette whose number is thus stored is again placed in the drive unit after completion of the playback of the whole cassette and completely rewound before being reset in the magazine.

It is a yet further object of the invention to provide a tape cassette recording/playback apparatus in which when timer recording is employed, different cassettes can be used for recording in such a manner that manual editing can be dispensed with.

The aforementioned object is accomplished by providing a tape cassette recording/playback apparatus wherein for the timer recording, recording start and terminating times and the number of a cassette to be played during these time periods are designated on a timer recording basis, and wherein the cassettes are used for recording in the order of the number thus designated.

DESCRIPTION OF THE PREFERRED EMBODIMENTS

Figure 1:
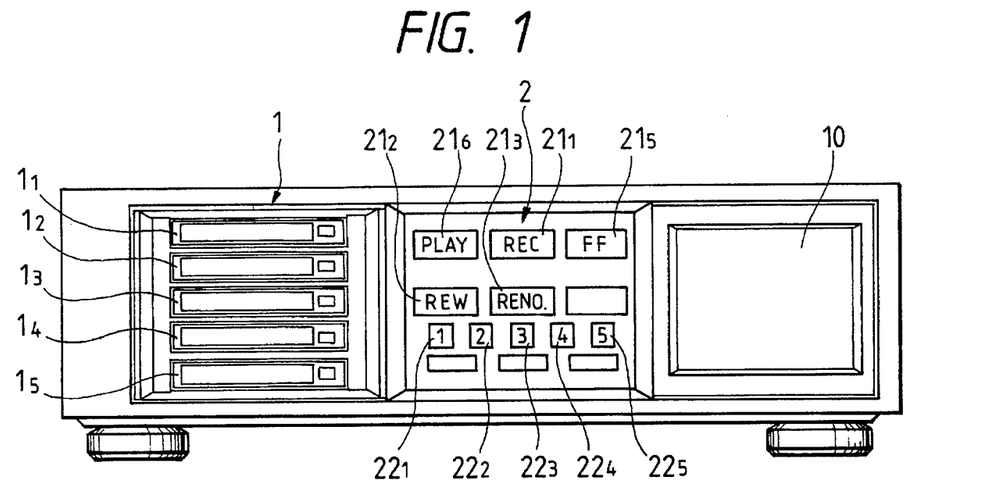
FIG. 1 is a front view of a magnetic recording/playing apparatus embodying the present invention.

FIG. 1 shows a front view of a magnetic recording/playback apparatus embodying the present invention.

As shown in FIG. 1, a plurality of cassette halves are stored in a storage unit 1; namely, five layers of storage shelves $1_1$ to $1_5$ are provided to store five cassettes, the cassettes being moved in and out from the front panel of the apparatus An operating unit 2 includes various operating keys for designating operating modes, including recording (REC key) $21_1$, playback (PLAY) $21_6$, fast forward (FF) $21_5$, and rewind (REW) $21_6$, and keys for timer setting and designating a shelf number in the storage units 1. A display unit 10 is used to display various kinds of data such as the operating mode or time data. Also, the operating unit 2 includes an operating key (RENO.) $21_3$ for designating the process of rewriting a program number peculiar to a digital audio tape recorder, and shelf number designating keys $22_1$ to $22_5$ for designating shelf numbers corresponding to the storage shelves $1_1$ to $1_5$. The process of rewriting the program is conducted when the program numbers not arranged in order from the head of the magnetic tape are rearranged in numerical order as in the case where the user has recorded programs at random.

Figure 2:
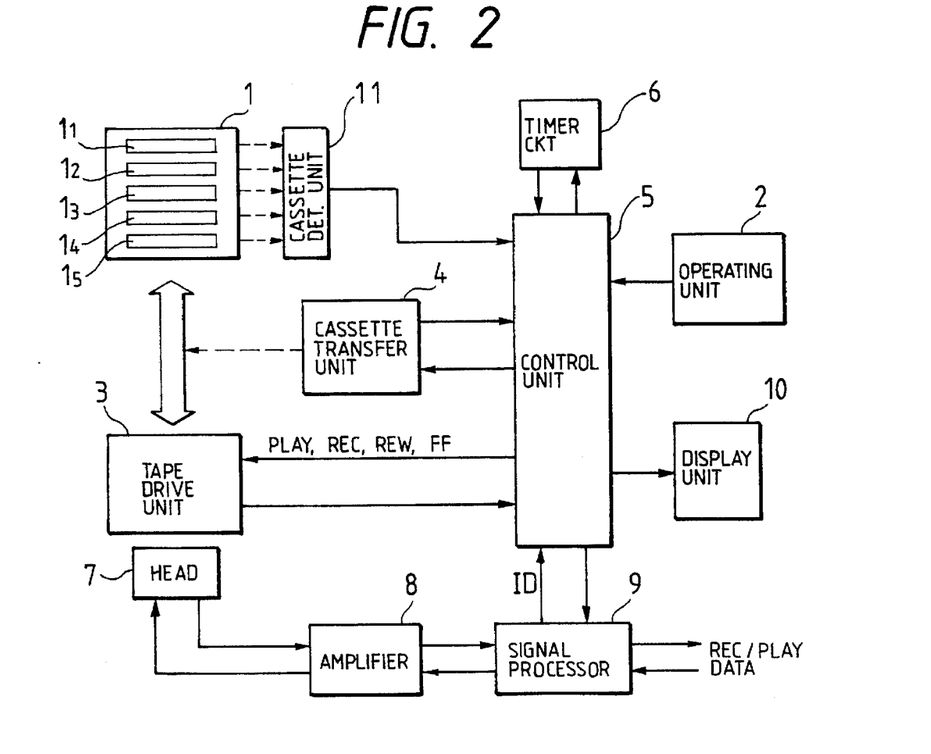
FIG. 2 is a block diagram of a first preferred embodiment of the present invention.

FIG. 2 is a block diagram of the magnetic recording/playback apparatus embodying the present invention.

Cassette detection section 11 shown in FIG. 2 detects the presence or absence of cassettes on the storage shelves $1_1$ to $1_5$ in the storage unit 1 using light-emitting diodes and photo diodes disposed near the respective storage shelves $1_1$ to $1_5$. When a cassette intercepts the light emitted by a light-emitting diode, the interception of the light is detected by a corresponding photodiode and the presence of the cassette is thus detected by the output of the photodiode. Also, such a detection unit can be realized by the provision of a mechanical switch arranged inside each storage shelf.

The tape drive unit 3 drives the cassette tape and outputs signals indicating the detection of the end and head of the tape and the completion of installation of a cassette, in addition to an FG signal indicative of the speed of one of the tape reels.

The cassette transfer unit 4 transfers the cassette from the storage unit 1 to the tape drive unit 3 and vice versa. On receiving a signal indicating the number of the storage shelf in the storage unit 1 and a drive signal, the cassette transfer unit takes the cassette from the designated storage shelf and mounts it in the tape drive unit 3. On receiving a drive signal while the cassette is mounted in the tape drive unit 3, the cassette transfer unit returns the cassette from the tape drive unit 3 to the designated storage shelf in the storage unit 1.

A control unit 5 provided with a microprocessor carries out normal recording/playback operations, such as fast forwarding or rewinding, in conformity with instructions from the operating unit 2. On receiving a start signal instructing the commencement of a playing operation, the control unit 5 starts controlling the playback operation, at the designated time of timer playback, by detecting the program from the cassettes stored in the storage unit 1, as will be described in more detail later.

A timer circuit 6 operates supplies power to the cassette transfer unit 4, etc., at a time preset by the control unit 10 and applies a start signal for the operation of the timer to the control unit 5.

There is also shown an arrangement of a helical scanning rotary head 7, an amplifier 8 and a signal processor 9, wherein an RF signal read by the rotary head 7 is amplified by the amplifier 8. The produced data is processed in the signal processor 9, whereby a start ID, etc., are detected. When recording is performed, the signal from the signal processor 9 is amplified by the amplifier 8 before being recorded by the rotary head 7.

Figure 3:
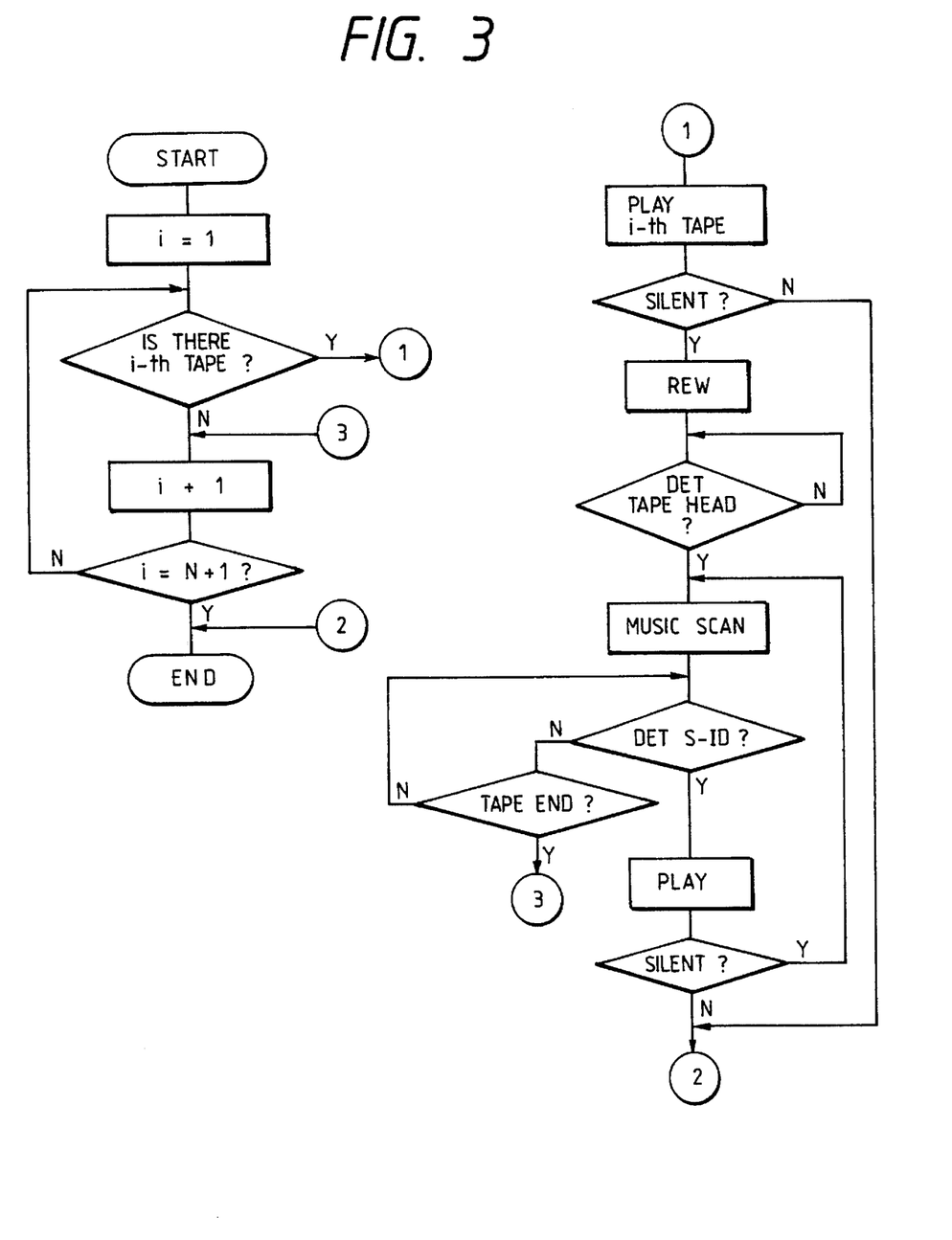
FIG. 3 is a flowchart illustrating the operation of the control unit of the apparatus of FIG. 2.

FIG. 3 is a flowchart illustrating control operations effected by the control unit at the time of timer playback.

When a start signal is produced from the timer circuit 6, the control unit sets a variable i at 1 and detects the presence or absence of the cassette on the storage shelf 11, the variable i representing the position where the cassette corresponding to each of the storage shelves $1_1$ to $1_5$ is stored.

On detecting the designated cassette on the storage shelf $1_1$, the cassette detection unit 11 applies a signal designating the storage shelf $1_1$ to the cassette transfer unit 4, which extracts the cassette from the storage shelf $1_1$ and mounts it in the tape drive unit 3.

On receiving a signal indicating the completion of the installation of the cassette from the tape drive unit 3, the control unit applies a playback drive signal (play signal) to the tape drive unit 3 to cause the playback operation to be performed.

On the other hand, if the cassette is detected on the storage shelf $1_1$ by the cassette detection unit 11, the control unit increments the variable i by ne and searches for the desired cassette on the storage shelves $1_2$, $1_3$, .. sequentially in order (until the variable i becomes greater by one than the number of storage shelves) while repeating the playback operation until the desired cassette is detected.

When a program of, e.g., music is reproduced within a predetermined period of time upon mounting the cassette in the tape drive unit 3 and performing the playback operation, the control unit continues with the playback operation. However, if a silent state continues for a fixed period of time with the reproduction of no program, the control unit sends a rewind drive signal (REW signal) to the tape drive unit 3 to cause the cassette to be rewound.

On receiving a detection signal indicating that the tape has been completely rewound, the control unit applies a drive signal (FF signal) designating a high-speed search operation to the cassette drive unit 3 to carry out a high-speed search operation while detecting the start IDs until the tape end is detected.

When a start ID is detected, the control unit produces a playback drive signal to resume the playback operation and, if the silent state continues for a fixed period of time while a playback operation is being performed, a high-speed search is conducted and the above-described operation is repeated.

If the tape end is detected without the reproduction of the program, the control unit increments the variable i by one as in the case where no cassette is detected on the storage shelf 1, and detects the cassettes sequentially in order on the storage shelves $1_2$, $1_3$, . . . and performs the above-described operations in the same manner as already described.

Accordingly, a program of, e.g., music can be played back automatically as far as there exists at least one cassette stored and at least one program recorded on the cassette corresponding to the designated selection.

As described above, a plurality of cassettes are stored on the storage shelves and the presence or absence of a desired cassettes is detected successively during timer playback. If no playback operation is performed for a fixed period of time, the control unit searches through a tape from its head for a program, and a playback operation is performed with respect to the next cassette when no recorded program is found on the preceding one. Accordingly, the trouble of having to repetitively replace the cassettes is eliminated.

A second embodiment of the invention will be described with reference to FIG. 4. In this embodiment, when a shelf number designating key $22_1$ to $22_5$ is depressed together with the REC key $21_1$ while a program of, e.g., music is being recorded on a cassette installed in the tape drive unit 3, the recording process is continued on a cassette on the storage shelf designated by the depressed shelf number designating key $22_1$ to $22_5$ after recording on the present cassette is terminated.

The tape drive unit 3 drives the cassette installed therein and outputs signals indicating the detection of the end and head of the tape and the completion of installation of the cassette therein, in addition to an FG signal indicating the tape reel speed.

The cassette transfer unit 4 transfers the cassettes from the storage unit 1 to the tape drive unit 3 and vice versa. On receiving a signal indicating the number of a storage shelf in the storage unit 1 and a drive signal, the cassette transfer unit extracts the cassette from the designated storage shelf and mounts it in the tape drive unit 3. On receiving a drive signal while the cassette is mounted in the tape drive unit 3, the cassette transfer unit returns the cassette to the designated storage shelf in the storage unit 1.

A memory 26 is used to store the shelf number designated by the chosen shelf number designating key $22_1$ to $22_5$ and the control 5 effects normal recording/playback, fast forwarding or rewinding operations in conformity with the instructions from the operating unit 10, as in the previously discussed embodiment. The control unit 6, stores in the memory 26 the shelf number designated by the chosen shelf number designating key $22_1$ to $22_5$ during recording, and sends a signal indicating the shelf number stored in the memory 26 and a drive signal to the cassette transfer unit 4 when recording of the present cassette is terminated to cause continuous recording to be carried out.

Based on an FG signal supplied from the drive unit 3, the control unit 5 computes the remaining time relative for the present cassette for recording and drives the display unit 10 to display a message when the remaining time reaches a predetermined level.

Figure 5:
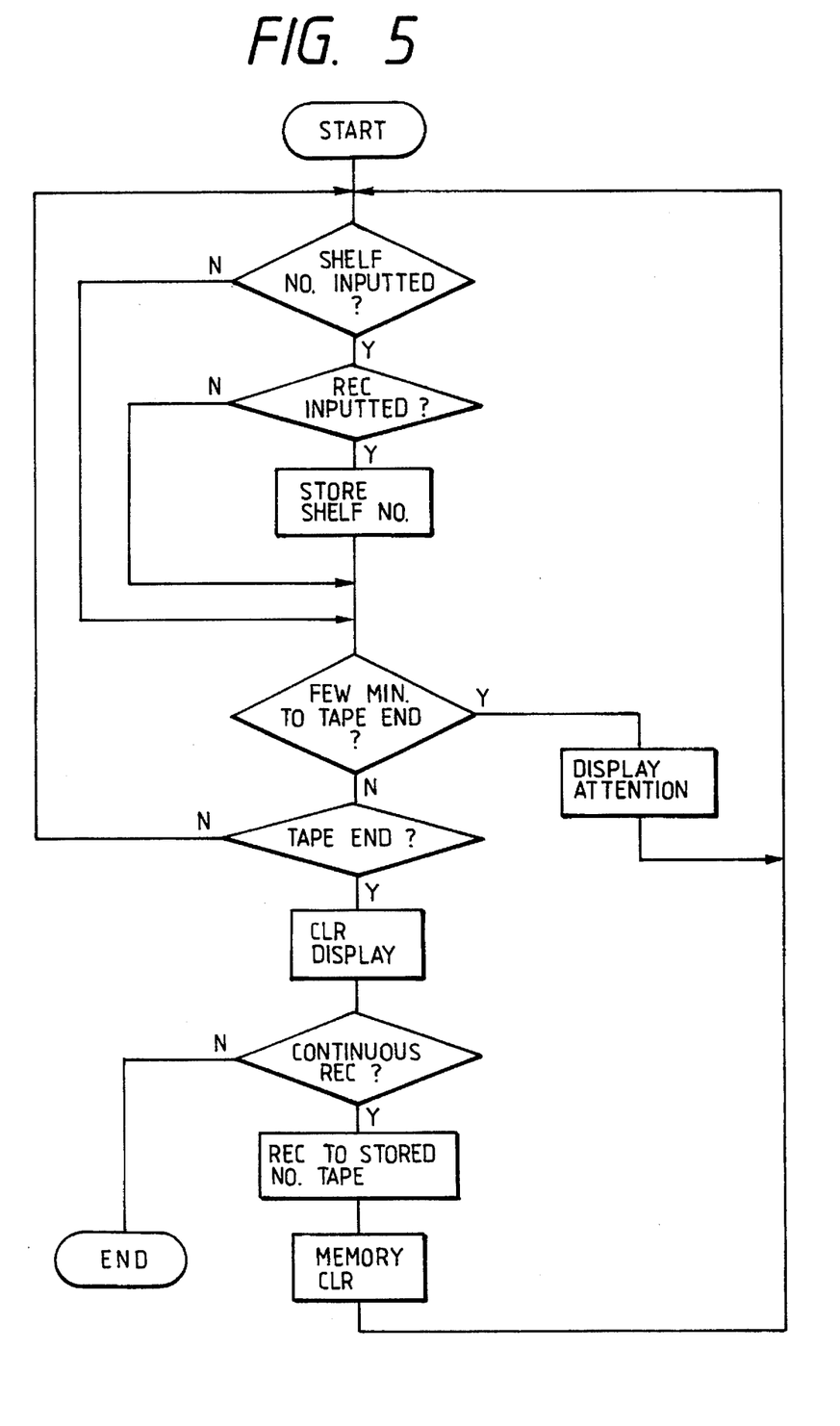
FIG. 5 is a flowchart illustrating the operation of the control unit in the apparatus of FIG. 4.

FIG. 5 is a flowchart illustrating the control operations carried out by the control unit 5. A control operation while recording is being carried out will subsequently be described.

When an input from the REC key $21_1$ is followed by an input from the chosen shelf number designating key $22_1$ to $22_5$, the shelf number supplied by the chosen shelf number designating key $22_1$ to $22_5$ is stored in the memory 26.

This operation is performed until the end of the cassette being used for recording is detected, and the shelf number is successively stored in the memory 26 each time it is supplied. The display unit 10 provides a display message for calling attention to the decrease of the remaining time to a predetermined value.

When the tape end is detected, the control unit 5 clears the displayed message from the display unit 10 and, provided the inputs of the shelf designating key 22 and the REC key $21_1$ have been applied, determines the continual recording mode is valid and reads the shelf number stored in the memory 26. After storing data indicative of the cassette in the tape drive unit 3 in the memory 26, the control unit 5 applies the shelf number read from the memory 26 and the drive signal to the tape drive unit 3 to thus effect continuous recording sequentially relative to the designated cassette, and then clears the memory 5.

The apparatus embodying the present invention is designed so that the user is allowed to confirm the designating number (storage shelf number) of the cassette to be subsequently used for recording while continuous recording is in effect.

Figure 6:
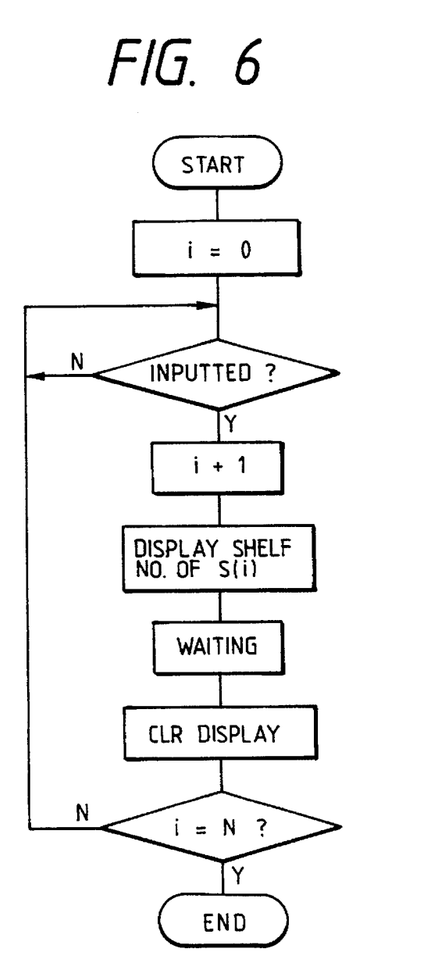
FIG. 6 is a flowchart illustrating display control for displaying the reel number of the next cassette during continuous recording in accordance with the second embodiment of the present invention.

The storage shelf number designated for continuous recording is successively stored in the memory 26 in a storage area S(i) identified by an index i.

The control unit 5 resets the index i to "0" at the time continuous recording is started and, when an input of a predetermined operating key (e.g., the "+" key) is applied, increments the index i by 1, whereby the display unit 10 is caused to display the storage shelf number stored in the storage area S(i) for a predetermined length of time.

The control unit 5 increments the index i by 1 each time the input of the operating key is applied and causes the storage shelf number stored in the memory 26 to be successively displayed by the display unit 10.

FIG. 6 is a flowchart of the above-described control operations.

Although it has been described above that continuous recording is carried out when the REC key $21_1$ is operated after the chosen shelf number designating key $22_1$ to $22_5$ is operated so as to call attention to the confirmation of the operation, needless to say it is possible to use only the operation of the chosen shelf number designating key $22_1$ to $22_5$ to effectuate the process.

When the tape end of the cassette is nearly reached during recording, moreover, a message is displayed to call attention to whether or not continuous recording is required.

As set forth above, a plurality of cassettes are stored in the storage shelves in the magnetic recording/playback apparatus such as a digital audio tape recorder according to the present invention in such a manner that a storage shelf designated during a recording operation is stored and a recording operation is automatically performed on the designated cassette after the termination of the recording operation on the present cassette. Accordingly, the plurality of cassette are usable for continuous recording.

A third embodiment of the invention will now be described with reference again to FIG. 2 of the drawings and to the flowchart of FIG. 7.

Figure 7:
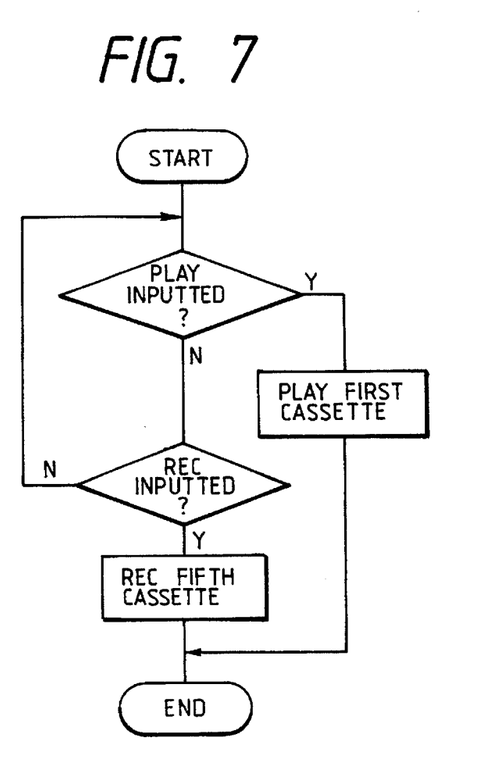
FIG. 7 is a flowchart illustrating the operation of the control unit of FIG. 2 in accordance with a third embodiment of the invention.

FIG. 7 is a flowchart illustrating the control operations effected by the control unit 6 in the third embodiment. When the playback mode is set through the operation of the PLAY key $21_6$ of the operating unit, the control unit applies a signal indicating the number of a predetermined first storage shelf $1_1$ to the cassette transfer unit 4, which in response extracts the cassette stored on the storage shelf $1_1$ and mounts it in the tape drive unit 3 to perform a playback operation.

When the recording mode is set through the operation of the REC key $21_1$ of the operating unit, the control unit applies a signal indicating the number of a predetermined fifth storage shelf $1_5$ to the cassette transfer unit 4 to cause a recording operation to be performed on the cassette stored on the storage shelf $1_5$.

The above-described control operations refer to normal control. As for the timer operation, the same control operations are employed in dependence on the operating key activated when the timer circuit 6 outputs a start signal. In other words, timer playback on the cassette from the first storage shelf $1_1$ is effected in the playback mode, whereas timer recording on the cassette from the fifth storage shelf is carried out in the recording mode.

In this manner, the cassette on a predetermined different storage shelf is automatically used according to the recording or playback mode. Thus, the storage shelves can be divided into positions for dedicated use in recording and playback. Consequently, the trouble resulting from confusing cassettes intended for recording and playback can be reduced, which makes it possible to provide an apparatus offering excellent operability.

Moreover, since the storage shelves for dedicated use in recording and playback are divided from one another, the operation of setting both the operating key of each mode and the number designating the storage shelf can be dispensed with when recording or playback is carried out. Accordingly, the keyboarding operations are minimized.

As set forth above, a plurality of cassettes are stored on the storage shelves in the magnetic recording/playback apparatus, and the cassettes on the various storage shelves are selectable usable in the playback and recording modes. Accordingly, the storage shelves can be divided into two groups for dedicated use in recording and playback and, since the storage shelves for use in recording and playback are predetermined, it is only necessary to operate either key in the recording or playback mode. The keyboarding operations are thus minimized, and the operability of the apparatus is improved.

Figure 8:
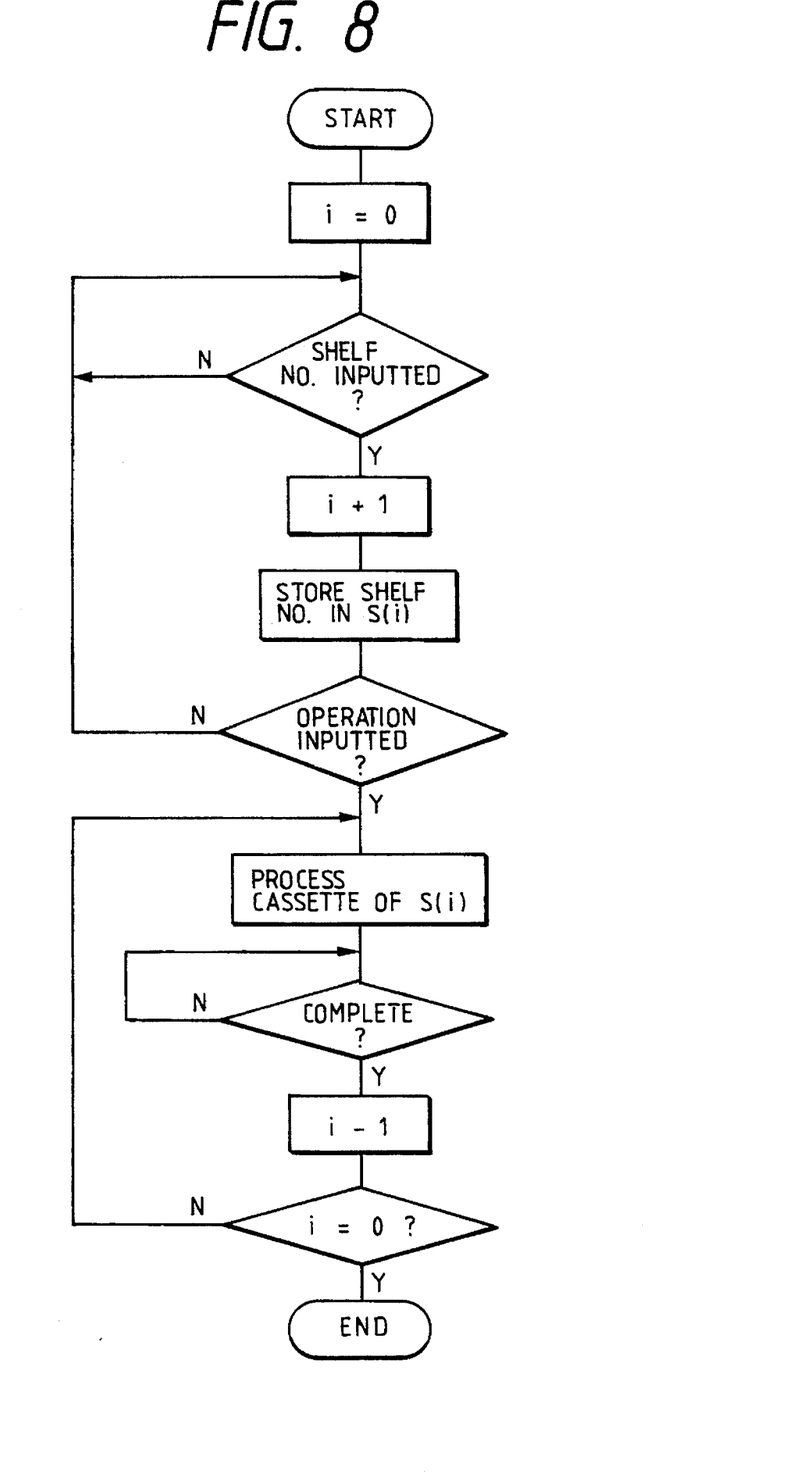
FIG. 8 is a flowchart illustrating the operation of the control unit in accordance with a fourth embodiment of the invention.

In accordance with a fourth embodiment, when the shelf number designating keys $22_1$ to $22_5$ are used to designate a storage shelf and then an operating key (REW key $21_2$, etc.) for designating an operating mode process is pressed, the designated process is automatically applied to the cassette on the designated storage shelf. That is, when the REW key $21_2$ is pressed after the storage shelf designating keys $22_1$, $22_2$ and $22_3$ are successively pressed, for instance, a rewinding operation is performed on the cassettes stored on the storage shelves $1_1$, $1_2$, and $1_3$, respectively, having storage shelf numbers "1", "2" and "3".

Figure 4:
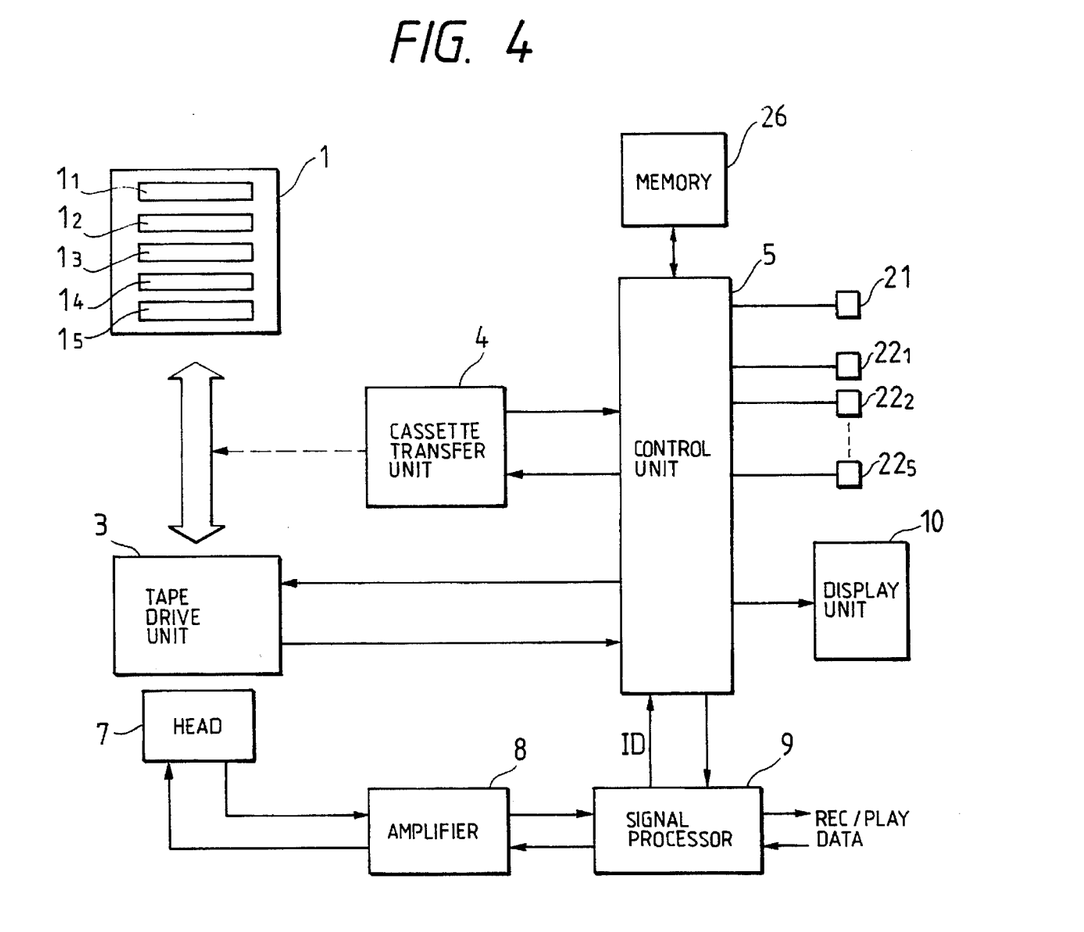
FIG. 4 is a block diagram of a second embodiment of the present invention.

FIG. 8 is a flowchart illustrating control exercised by the control unit 5 of FIG. 4 in accordance with the fourth embodiment. In FIG. 4 an index i identifies a storage area S(i) of the memory 26, which is initially set to "0".

When the input of a shelf number designating key $22_1$ to $22_5$ is applied, the control unit increments the index i by 1 and stores the shelf number thus supplied in the storage area S(1) and further determines whether the input of an operating key $21_1$ to $21_6$ such as that of the REW key $21_2$ or RENO. key $21_3$ is supplied. The control unit successively detects the input of the shelf number designating key $22_1$ to $22_5$ until the input of the operating key 21 is supplied and successively stores the shelf number designated in the respective storage areas S(2), S(3), . . . .

When the input of an operating key $21_1$ to $21_6$ is supplied, the control unit reads the shelf number from the arrangement storage area S(i) designated by the index i and supplies data indicative of the designated storage shelf to the cassette transfer unit 4. Further, the control unit conducts the process designated by the depressed operating key $21_1$ to $21_6$ (e.g., rewinding or program rewriting).

When the process is completed, the control unit decrements the index i by 1 and conducts the same process relative to the next cassette on the storage shelf indicated by the shelf number stored in the storage area S(i). The process is terminated when the index i becomes "0".

The plurality of storage shelves are thus designated and the desired process relative to the cassette on the designated shelf can be conducted by pressing the operating key only once.

As set forth above, a plurality of cassettes are stored on the storage shelves in the magnetic recording/playback apparatus in such a manner that the designated storage shelf is stored and the process in the designated mode is successively conducted on the cassette on the storage shelf thus designated. Accordingly, the same process can be carried out on a plurality of cassettes automatically through a simple operation, and moreover the operability of the apparatus is improved due to the minimized keyboarding operation.

Referring to the block diagram of FIG. 9, a circuit incorporated in the tape recording/playback apparatus shown in FIG. 1 in accordance with a fifth embodiment will be explained. It is noted that reference numerals identical to those shown in FIG. 1 refer to identical components, and a further detailed description thereof will be omitted.

Figure 9:
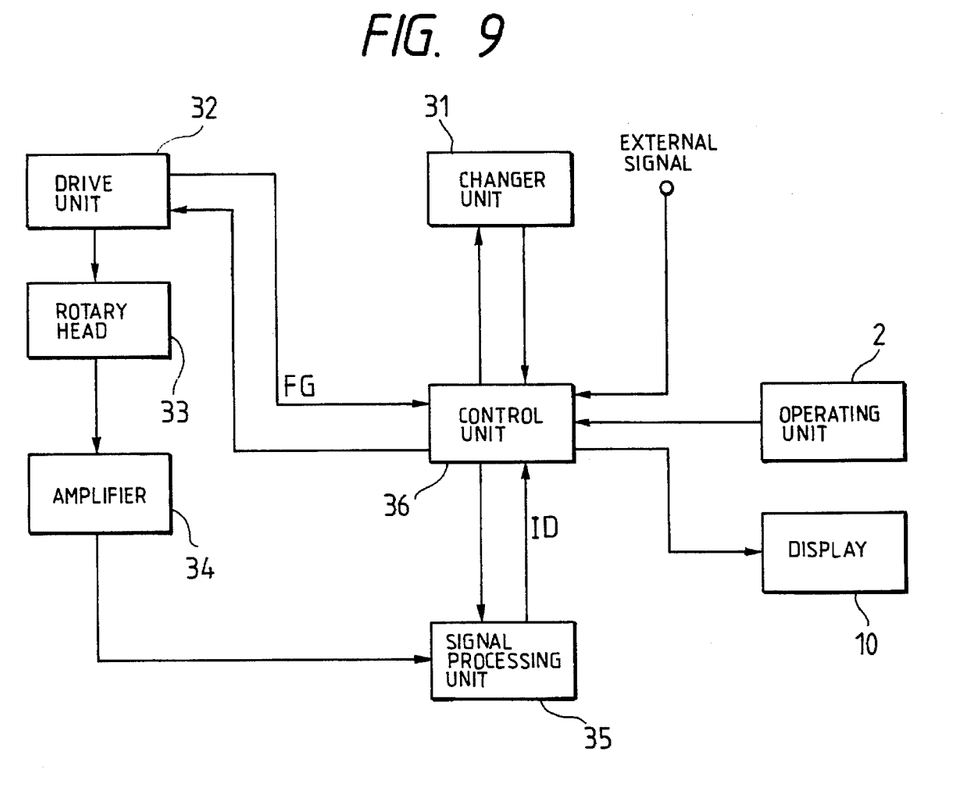
FIG. 9 is a block diagram showing a fifth embodiment of the invention.
Figure 10:
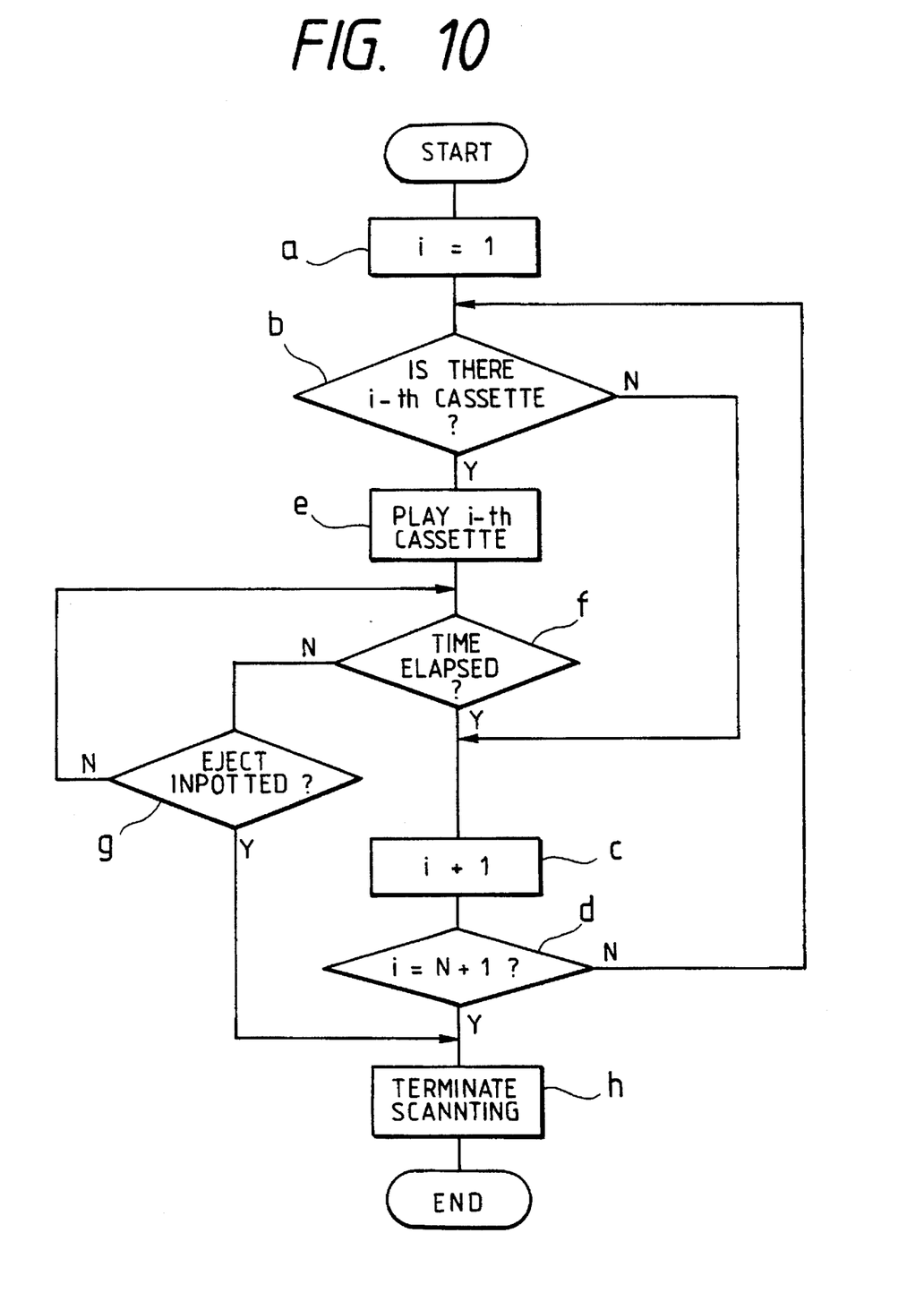
FIG. 10 and 11 are flowcharts showing operations carried out with the fifth embodiment.
Figure 11:
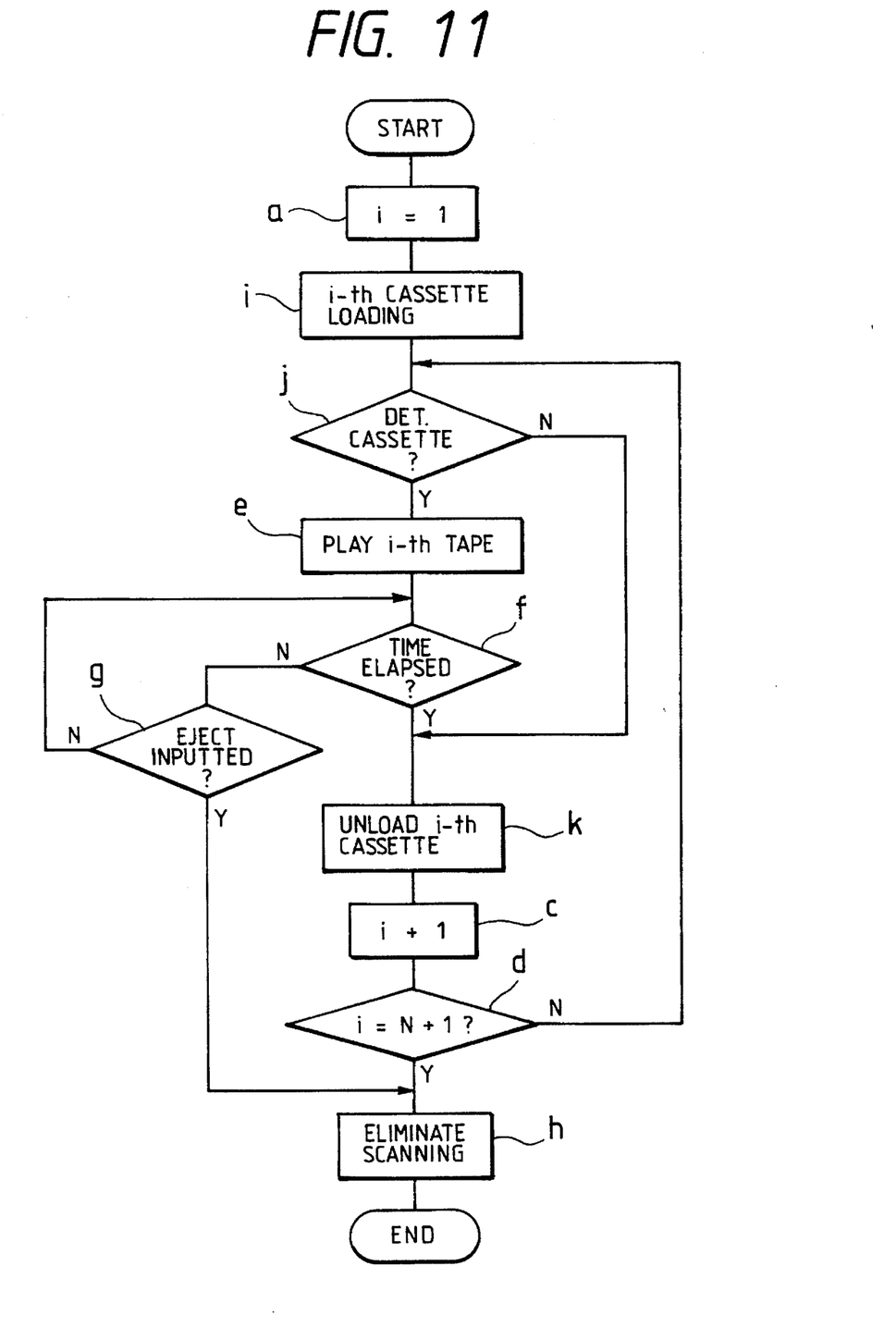

In FIG. 9, there is shown an arrangement including a mechanical drive unit 32 for recording and replaying a cassette selected and transferred from the shelves by a changer unit 31, a rotary head 33, an amplifier 34 for amplifying signals reproduced by the rotary head 33, a signal processing unit 35 for identifying various control signals recorded on a tape and fed from the amplifier 34 and outputting the same, and a control unit 36 for controlling the mechanical drive unit 32, the signal processing unit 35, the changer unit 31 and the display 10 according to the various data signals from the mechanical drive unit 32, the signal processing unit 35 and the operating unit 2, the control unit 36 performing a series of operations in accordance with the procedures shown in the flowcharts shown in FIGS. 10 and 11, as will be described below. An external synchronizing signal is also supplied to the control unit 36.

Referring to the flowchart of FIG. 10, it is assumed that the drive unit is equipped with a sensor for detecting the presence of a cassette.

When an introduction scanning control button for replaying each cassette in the operating unit is selected, the control unit sets the first cassette as an i-th cassette (Step a); monitors whether the i-th cassette is loaded in the holder of the drive unit (Step b); issues instructions as to the examination of next cassette provided the i-th cassette is absent (Step c); monitors whether the next cassette is a final one (Step d); and returns to Step b if the final cassette is absent and again monitors whether still another cassettes is loaded in the holder of the drive unit.

On detecting a cassette in Step b, the control unit operates to send to the mechanical drive unit 32 a signal for starting the playback of the detected cassette. Consequently, the mechanical drive unit 32 starts replaying the cassette (Step e). When playback is started, the control unit 36 monitors the elapsed time (Step f) and transmits a playback stop signal to the mechanical drive unit 32 after a fixed interval, and further proceeds to a Step c in which the playing of the next cassette starts.

During monitoring of the elapsed time in Step f, the control unit 36 monitors whether an eject button is pressed (Step g) and, if the eject button is pushed during that period, it terminates the introduction scanning operation (Step h).

Further, the control unit repeats the introduction scanning operation to complete the playback of all cassettes and, since a signal indicating the completion of the playback of all cassettes is issued in Step d, an output for stopping the introduction scanning operation is transmitted.

Although the description above refers to the case where a cassette is detected in the drive unit, the presence of the cassette may be detected in the mechanical drive unit 32 to effect performance of the introduction scanning operation. Referring to FIG. 11, operations in the latter case will be described. Like characters refer to similar steps in the flowchart of FIG. 9, and a further description thereof will be omitted.

Similarly as mentioned above, the first cassette is selected (Step a) and the cassette thus selected is transferred to the mechanical drive unit 32 for the preparation of tape loading (Step i). If no cassette is present, no loading operation is performed, and therefore the control unit 36 determines the absence of the cassette (Step j) and transmits an unloading signal to the mechanical drive unit (Step k) so as to advance to the condition in which the next cassette is drawn. Accordingly, the control unit 36 shifts to the next Step c to play the next cassette. In case a cassette is detected in Step j, the control unit allows the playback of the cassette thus loaded (Step e), i.e. an operation similar to that shown in FIG. 9 is initiated.

As set forth above, the cassette loaded into the drive unit after being extracted from the shelves is replayed for a predetermined time, and the cassette is returned to the shelves after completion of the playback operation while the next cassette is continually played in a similar operation so that only the leading ends of all cassettes are played. Accordingly, the contents of all cassettes can be checked without having to manually extract the cassettes one after another to check the labels thereof or to repeatedly play and stop each cassette. The contents of each cassette can thus be confirmed without any troublesome operation.

Figure 12:
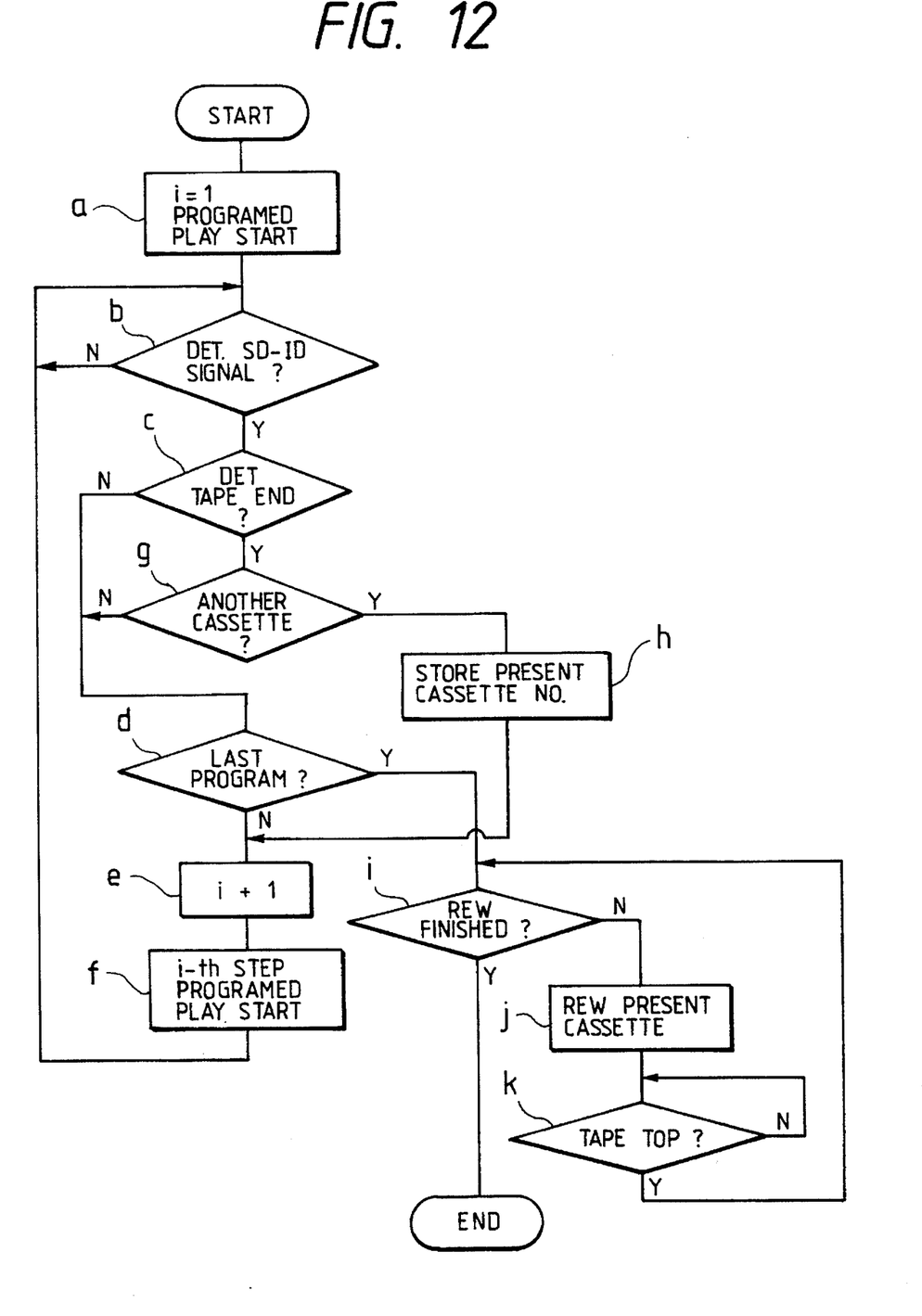
FIG. 12 is a flowchart describing operations in a sixth embodiment of the invention.

A sixth embodiment of the invention will be described with reference to the flowchart of FIG. 12. The overall arrangement of the apparatus of the embodiment is the same as that shown in FIGS. 1 and 9.

When a program is played back by designating a plurality of pieces of music from the cassettes in such a manner that the operating unit 2 designates a particular piece from a particular cassette, the cassette thus designated is moved from the shelves to the mechanical drive unit 32, the tape is loaded, and playback is started (Step a). The control unit 5 monitors an end signal of the designated piece from the reproduced signal from the cassette being played, i.e., an ST-ID signal, which is a signal designating the head of the piece being played, supplied from the signal processing unit 35 via the rotary head 33 and the amplifier 34 (Step b). Unless the ST-ID signal is supplied from the signal processing unit 35, the tape is allowed to continue to be run until its end is reached. For this reason, the control unit 36 monitors the tape end through the drive unit 32 to detect the leader tape at the tape end (Step c). If the control unit 36 detects the ST-ID signal before detecting the tape end, it determines whether the program has been played back completely (Step d). The control unit 36 further selects another cassette in the next step (Step e), moves the cassette thus selected into the drive unit 32, and loads the tape to have the designated piece reproduced (Step f).

Provided the next program is contained on the same cassette as in the aforesaid operation, the control unit 36 instructs the fast feeding and rewinding of the tape prior to proceeding to Step e. Upon detecting the ST-ID signal indicating the head of the next piece, the playback operation is performed. The process then proceeds to Step e.

Unless the ST-ID signal indicating the head of the next piece is supplied in Step c, the tape is allowed to move until the tape end is reached. Consequently, the tape end signal is supplied from the drive unit 32 to the control unit 36. The control unit 36 then determines whether the next program represents a piece on the same cassette or is contained on another cassette (Step g), and, if the next piece is on another cassette, stores the reel number of the present cassette in the memory (Step h). The control unit returns to Step e after storing the number in the memory, selects a cassette programmed in the next stage, and starts the playback of the program.

When the piece programmed in the following stage is on the same cassette in Step g, the control unit returns to Step d and performs the same operation.

The above-described operations are continuously performed until all pieces thus programmed are completed. When the item lastly programmed is completed, the control unit 36 determines that the program in Step d has been completed. Consequently, the control unit 36 monitors the presence of the cassette stored in step h and set for rewinding (Step i) and, if any cassette to be rewound is present, moves the cassette from the magazine to the drive unit 32 for loading and performing the rewinding operation (Step j). At this time, the control unit 36 monitors the winding state of the tape from the drive unit 2 (Step k) and, when it detects the winding position signal, returns to Step i to repeat the winding operation of all stored cassettes.

Subsequently, when a playing program, is being carried out, because all cassettes have been previously rewound completely, the operation of rewinding the tape prior to conducting a search operation for the selected pieces is saved. The total search time is thus considerably shortened.

As set forth above, a cassette is stored when the tape end of the cassette to be replayed according to a program is detected, and at least the cassette thus stored is moved into the drive unit again, rewound completely up to the tape end and returned to the drive unit for rewinding after all cassettes have been completely replayed. Accordingly, the time required to rewind the cassettes is saved at the time the next program is executed. The total search time is thus shortened.

Figure 13:
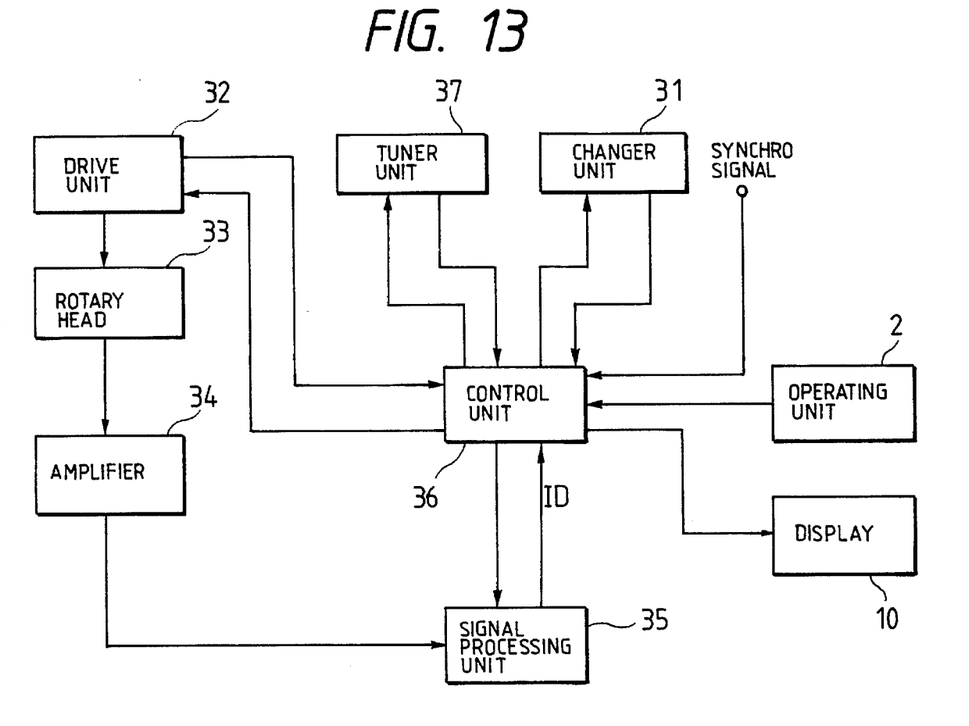
FIG. 13 is a block diagram of a tape cassette recording/playback apparatus of a seventh embodiment of the invention.
Figure 14:
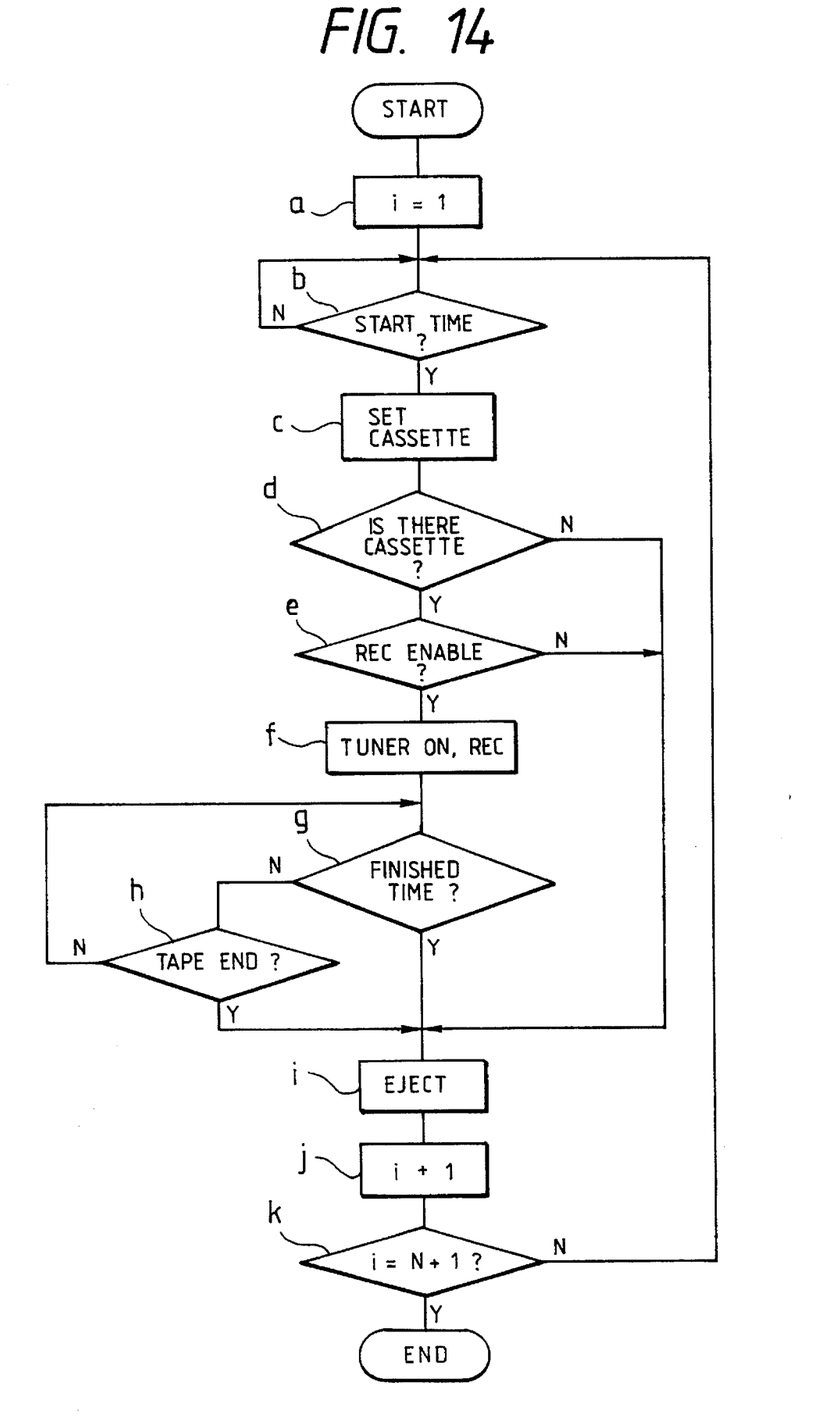
FIG. 14 is a flowchart showing operations in the seventh embodiment.

A seventh embodiment of the invention will be described with reference to the block diagram of FIG. 13 and the flowchart of FIG. 14. The seventh embodiment differs from the sixth embodiment by the addition of a tuner unit 37 through which a plurality of broadcast stations and a plurality of timers can be set. In this embodiment, the control unit 36 supplies power to the tuner unit 37 at times preset by a built-in timer. The output signal from the tuner unit 37 is supplied to the rotary head 33.

Referring to the flowchart of FIG. 14, the operations in the seventh embodiment will subsequently be described.

The operating unit 2 determines a particular cassette stored in the changer unit (shelves) 31 on which a particular program from a particular broadcast station is recorded for a particular length of time and sets the recording operation a desired number of times. Consequently, the broadcast stations, recording time and the identifying numbers of cassettes thus set are stored in the memory.

When timer-controlled recording is to be carried out, the control unit 36 executes a first step (Step a) and monitors whether the first timer start time is reached (Step b). In this case, the control unit 36 moves the cassette set corresponding to the set time from the changer unit 31 into the drive unit 32 when it detects the set time and remains in a standby state where the tape can be wound on the rotary head 33 for recording purposes (Step c). The control unit 36 in this state monitors whether a cassette is present in the drive unit 32 (Step d) and simultaneously ascertains whether recording is possible (Step e). When the control unit 36 detects the presence of a cassette and a situation in which recording is possible, it holds the tuner unit 37 on and, while supplying the broadcast signal from the tuner unit 37 to the rotary head 33, starts the recording operation (Step f).

Subsequently, the control unit 36 monitors whether the recording time set first has terminated and monitors to see whether the end of the cassette being used for recording is reached (Step h). If no cassette is detected in Steps d and e, when recording conditions are not met, and further when the recording operation has been completed in Steps g and h, the control unit 36 operates to eject the cassette from the drive unit 32 (Step i) and subsequently proceeds to the next step (Step j) and monitors whether this step is final (Step k). If it is not the final step, the control unit 36 returns to Step b and monitors the timer recording time secondly set.

Although reference has been made to the case where the tuner unit 37 is incorporated in the cassette tape recording/ playback apparatus in the above-described embodiment, the tuner unit may be installed separately and may be operated by instruction signals issued from the control unit 36.

As set forth above, recording start and terminating times and the identifying number of a cassette to be played during a specified time period are designated on a timer recording basis when timer recording is carried out a plurality of times, and the cassettes are used for recording in the order of the numbers thus designated. Accordingly, recording can be made on cassettes classified as to program use, with the effect of dispensing with the necessity of subsequent editing.

What is claimed is:

1. An apparatus which records program information onto a medium stored in a cassette and which reads program information which has been recorded on a medium stored in a cassette, the apparatus being of a type in which a cassette is extracted from a storage unit and transported to a drive unit for reading the information from the medium stored in the cassette, comprising:

operating means for operating the recording/reading apparatus;

means responsive to an instruction from said operating means for repetitively transporting in sequence a plurality of cassettes from said storage unit to said drive unit; and control means for controlling a reading of program information stored in each of said plurality of cassettes transported to said drive unit for a single common predetermined period of time, said time being less than the total time required to read all the information stored in said cassette, after which said transport means automatically transports a next cassette in said sequence to the drive unit without substantial interruption.

2. A recording/reading apparatus, according to claim 1, wherein said control unit plays a portion of a first program recorded on each cassette stored in said storage unit, said portion being determined by said single common predetermined period of time.

3. An apparatus according to claim 2, wherein the medium is a magnetic medium.

4. A recording/reading apparatus according to claim 3, wherein the recording/reading apparatus is a tape recording/playback machine for recording on and playing audio tapes.

5. An apparatus according to claim 1, wherein the medium is a magnetic medium.

6. A recording/reading apparatus according to claim 5, wherein the recording/reading apparatus is a tape recording/playback machine for recording on and playing audio tapes.

7. A method for operating a recording/reading apparatus of a type in which a cassette is extracted from a storage unit and transported to a drive unit for reading information recorded on a medium stored in the cassette and vice versa in response to an instruction from a means for operating said apparatus, said method comprising the steps of:

transporting a cassette from said storage unit to said drive unit;

scanning said medium in said cassette for a predetermined period of time, said time being less than the total time required to read all information stored in said cassette and repeating said steps of transporting a cassette and scanning said medium for said predetermined time for a plurality of cassettes in a designated sequence substantially uninterrupted, wherein an operator can terminate said method using a terminating device.

8. A method for operating a recording/reading apparatus, according to claim 7, wherein a portion of a first program is read from each cassette stored in said storage unit, said portion being determined by said single common predetermined period of time.

9. A method for operating a recording/reading apparatus according to claim 8, wherein the medium is a magnetic medium.

10. A method for operating a recording/reading apparatus according to claim 9, wherein the recording/reading apparatus is a tape recording/playback machine for recording on and playing audio tapes.

11. A method for operating a recording/reading apparatus according to claim 7, wherein the medium is a magnetic medium.

12. A method for operating a recording/reading apparatus according to claim 11, wherein the recording/reading apparatus is a tape recording/playback machine for recording on and playing audio tapes.

* * * * *